United States Patent [19]

Merry

[11] Patent Number: 4,830,901
[45] Date of Patent: May 16, 1989

[54] PRE-LUBRICATED METALLIC SHIELD TAPE

[75] Inventor: Steven R. Merry, Richmond, Ind.

[73] Assignee: Cooper Industries, Inc., Houston, Tex.

[21] Appl. No.: 158,807

[22] Filed: Feb. 22, 1988

[51] Int. Cl.⁴ ............................................. B32B 15/08
[52] U.S. Cl. .................................... 428/206; 428/168; 428/180; 428/402.2; 428/461; 428/321.5; 428/905; 156/47; 156/48; 156/51; 156/53
[58] Field of Search ...................... 428/461, 402.2, 206, 428/168, 180; 156/47, 48, 51, 53

[56] References Cited

U.S. PATENT DOCUMENTS

| | | | |
|---|---|---|---|
| 2,988,461 | 6/1961 | Eichel | 117/122 |
| 3,258,319 | 6/1966 | Cox | 428/461 |
| 3,513,943 | 5/1970 | Ernst et al. | 184/1 |
| 3,874,961 | 4/1975 | Steinert | 156/53 |
| 4,322,574 | 3/1982 | Bow et al. | 428/461 |
| 4,404,828 | 9/1983 | Blachford | 428/402.2 |
| 4,596,897 | 6/1986 | Gruhn | 428/209 |
| 4,654,256 | 3/1987 | Doree et al. | 428/402.2 |
| 4,691,081 | 9/1987 | Gupta et al. | 428/461 |

Primary Examiner—George F. Lesmes
Assistant Examiner—N. Ibrahim
Attorney, Agent, or Firm—Nelson A. Blish; Eddie E. Scott; Alan R. Thiele

[57] ABSTRACT

Shield tape (10) surrounds cable (20) in a sleeve-like fashion as it is fit through forming die (22) into cabling machine (28). Shield tape (10) is a metal foil mounted on a plastic substrate. Microencapsulated lubricant in a binder is incorporated on the outer surface of the metal foil portion of the tape (10).

4 Claims, 2 Drawing Sheets

PRE-LUBRICATED METALLIC SHIELD TAPE

BACKGROUND OF THE INVENTION

This invention relates to insulated cables and, in particular, to the use of shielding tape incorporating microencapsulated lubricant. In various types of cable, it is necessary to employ a layer of shielding tape surrounding the conductors. The purpose of this shielding tape is to reduce the chance of extraneous external signals effecting data carried by the cabling. The shielding tape may be applied to the cable by wrapping it in a spiral manner or by wrapping it around in a sleeve-like fashion by pulling it through the die simultaneously with pulling the cable through a die. However, the shielding tape is usually a thin layer of foil sometimes bonded to a plastic substrate and the thin layer of foil often becomes scuffed or torn during the manufacturing process when rubbed against machine and cable parts. To prevent this, prior art has applied a thin layer of lubricant to the tape during manufacturing.

Prior art attempts to apply lubricating oil in a tape manufacturing process have or had only limited success. For example, the two methods currently used are to apply oil by the drip method or using a prelubricated sponge. Using either of these methods, the amount of oil can only be roughly controlled. Too little oil and the tape becomes torn or scuffed, therefore, not performing in a satisfactory manner; or, too much oil and the oil is soaked up by the plastic substrate which changes its dielectric characteristics and, therefore, changes the characteristics of the cable. Also, if too much oil is applied, it adds to the cost of the cable unnecessarily. Excess oil can also create processing problems. Attempting to extrude a plastic jacket over excess oil results in blistering or bubbling of the plastic. Prelubricating tape prevents these problems.

SUMMARY OF THE PRESENT INVENTION

The present invention incorporates an insulating tape wherein a plastic substrate is bonded to a metal substrate. On the surface of the metal substrate, microcapsules of lubricating material in a binder provide the necessary lubrication to keep the thin metal tape from being scuffed or damaged during the manufacturing process. In one embodiment of the invention, the microcapsules in a binder are applied in a pattern so that there are areas of the metal tape which are not covered by microencapsulated lubricant. This leaves an area free for metal-to-metal contact with braiding or subsequent wrappings applied to the cable and further reduces the amount of lubricant and, hence, the cost required.

IN THE FIGURES

DETAILED DESCRIPTION OF THE INVENTION

Figure 1:
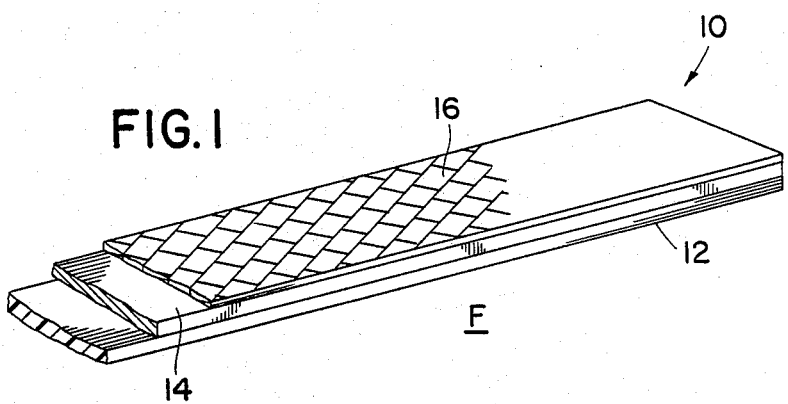
FIG. 1 is a perspective view of a shielding tape according to the present invention.

FIG. 1 shows the shield tape 10 according to the present invention. In this embodiment, a plastic substrate 12 is bonded to a metal substrate 14. The surface of metal substrate 14 is covered with a microencapsulated lubricant.

There are a number of materials which will be satisfactory for the present application. The requirement for substrate 12 is that it be flexible and it should also be an insulating material. Plastic materials such as polyethylene and polypropylene will work well in this application. Metal substrate 14 may be any number of suitable conducting materials. In one embodiment, a thin aluminum foil is used although other metal foils will be satisfactory.

Oil in microcapsules such as are well-known in the art are incorporated into a binder 16. Suitable oils include oils sold under trade names such as Silicone, Hyaline B, and other well-known oils. The oil used should have a high dielectric constant.

Figure 2:
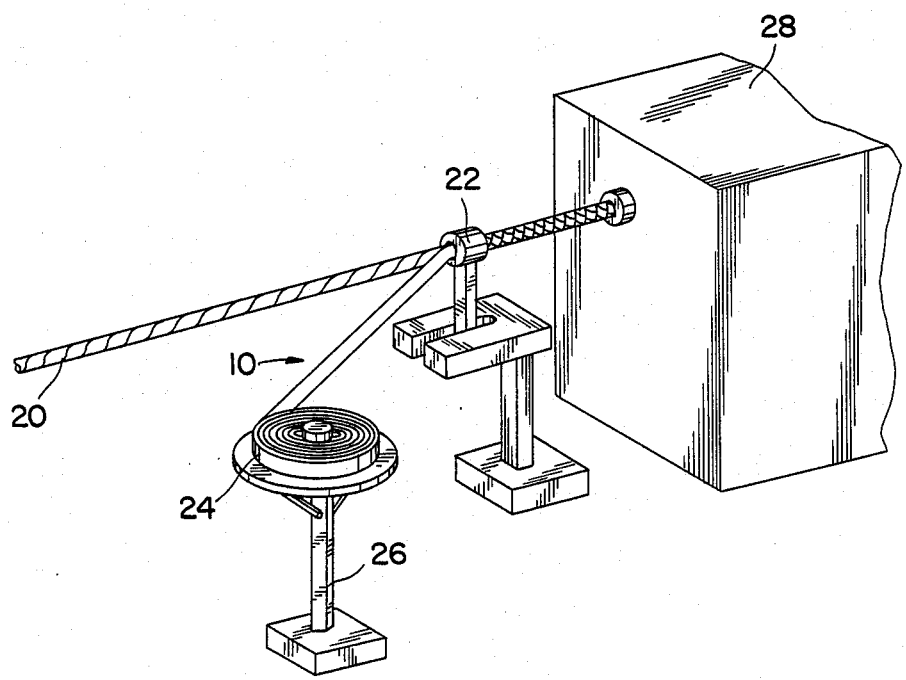
FIG. 2 is a perspective view of a cabling operation according to the present invention.

In operation, a cable 20, shown in FIG. 2, is drawn through a die (22). Shield tape 10 is drawn off tape pad 24 which is mounted on pad let-off 26. As the cable is pulled through die 22 by cabling machine 28, tape 10 is drawn around cable 20 in a sleeve-like fashion. As tape 10 rubs against metal parts, such as the die or internal to the cabling machine, the microcapsules are ruptured providing lubrication to prevent the tap 10 from being scuffed, torn, or broken.

Figure 3:
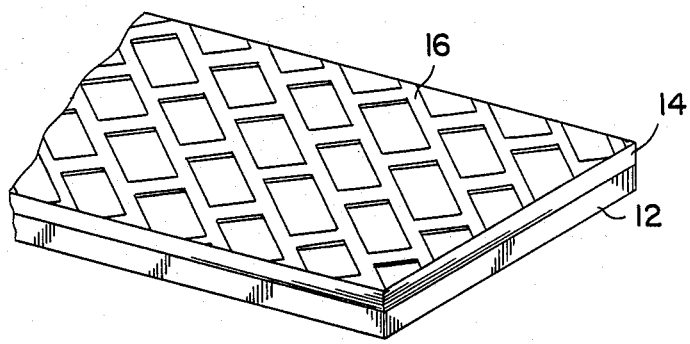
FIG. 3 is a perspective view of another embodiment of the shielding tape according to the present invention.

FIG. 3 shows an embodiment wherein the microencapsulated lubricant in the binder 16 is employed in a pattern shown as dark area on the surface of metal foil 14. This embodiment is used to further reduce the amount of lubricant required. For example, if the entire surface of metal 14 is covered with microencapsulated lubricant carried in a binder, the oil requirements would be reduced by 20% over prior art application with a sponge or drip. By using a checkerboard pattern, such as is shown in FIG. 3 with a 50% open area, this will further reduce oil requirements by an additional 50%. Also, if metal braid is applied around the shielding tape, some open area is required for metal-to-metal contact between the shield and the metal braid.

Figure 4:
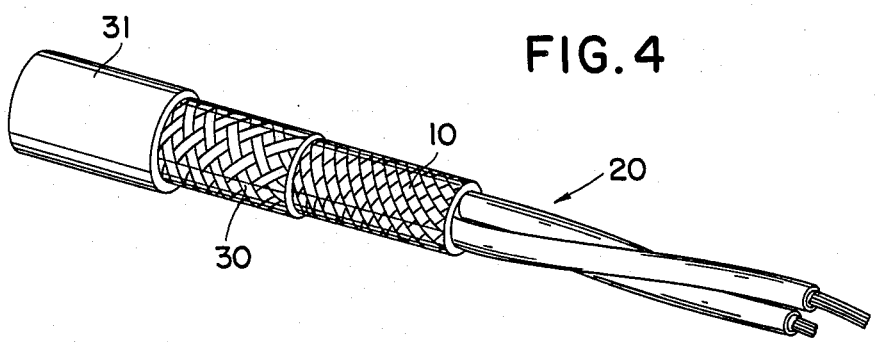
FIG. 4 is a perspective view partially cut away of a cable employing the shielding tape shown in FIG. 3.

FIG. 4 shows the shield tape of metal 30 employed as a covering to cable 20, cable 20 consisting of two insulating conductors. Metal braid 30 surrounds shield tape 10. Outer sheath of plastic 31 surrounds metal braid.

I claim:

1. A cable shielding tape comprising:
   a flexible plastic substrate;
   a metal bonded to said flexible substrate; and,
   microencapsulated lubricant oil bonded to said metal substrate on the side of said metal substrate opposite said flexible substrate.

2. A tape as in claim 1 wherein said microencapsulated lubricant is applied so that less than the entire surface of said metal substrate is covered.

3. A method of applying a shielding tape comprising a plastic substrate having a metal substrate bonded thereto to an electronic cable comprising: feeding said cable through a die into a cabling machine; bonding microencapsulated lubricant oil to the metal surface of said tape; and feeding said tape into said die.

4. A method of applying a shielding tape to a cable as in claim 3 wherein said microencapsulated lubricant is applied, so that less than the entire surface of said metal substrate is covered.

* * * * *